May 20, 1930. C. SELBACH 1,759,024
FILM WINDER
Filed Dec. 20, 1926 3 Sheets-Sheet 1

INVENTOR.
C. Selbach
BY Marks & Clerk
ATTORNEYS.

May 20, 1930. C. SELBACH 1,759,024
FILM WINDER
Filed Dec. 20, 1926 3 Sheets-Sheet 2
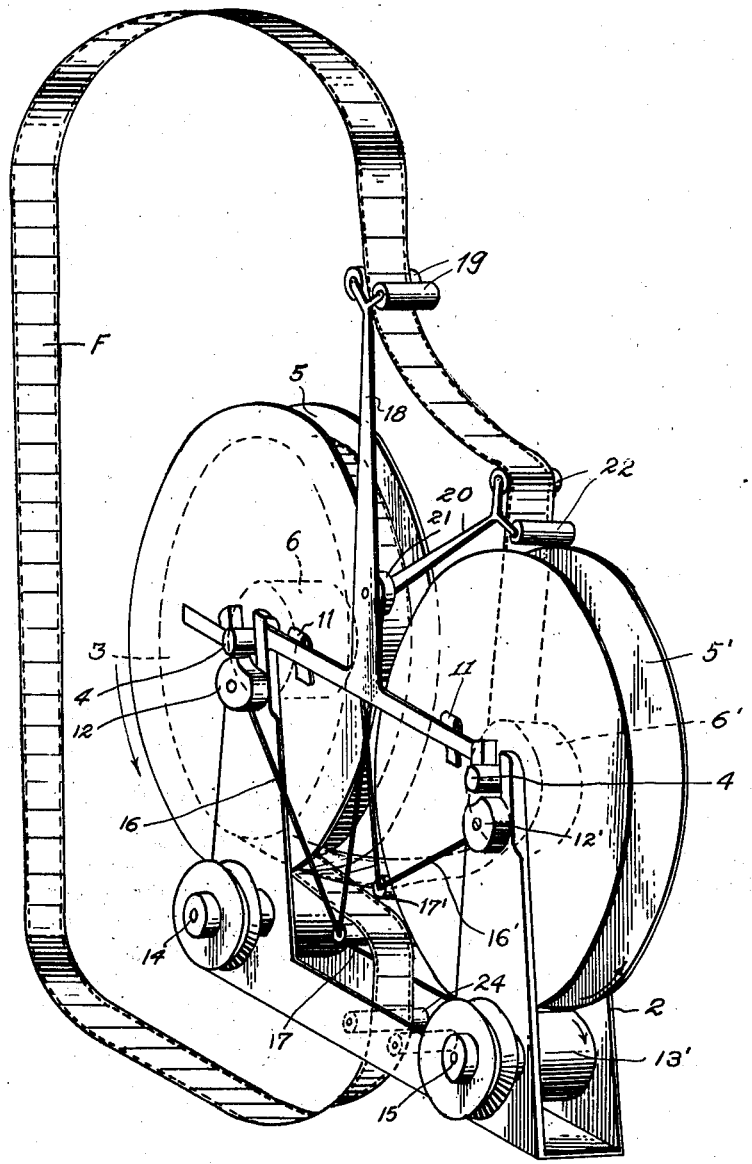
INVENTOR.
C. Selbach May 20, 1930.  C. SELBACH  1,759,024
FILM WINDER
Filed Dec. 20, 1926  3 Sheets-Sheet 3
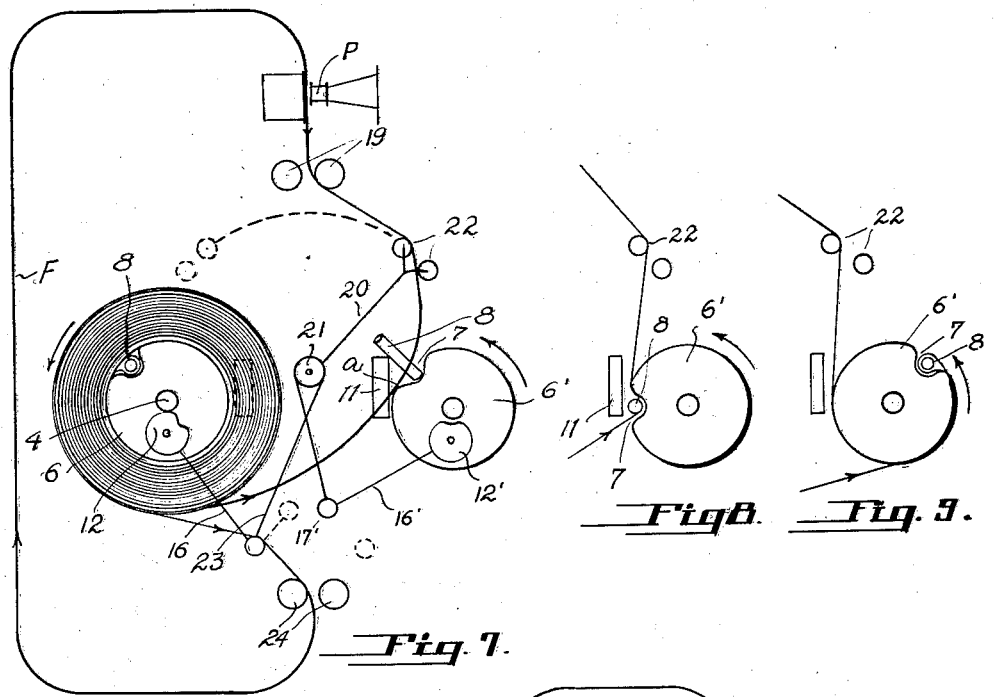
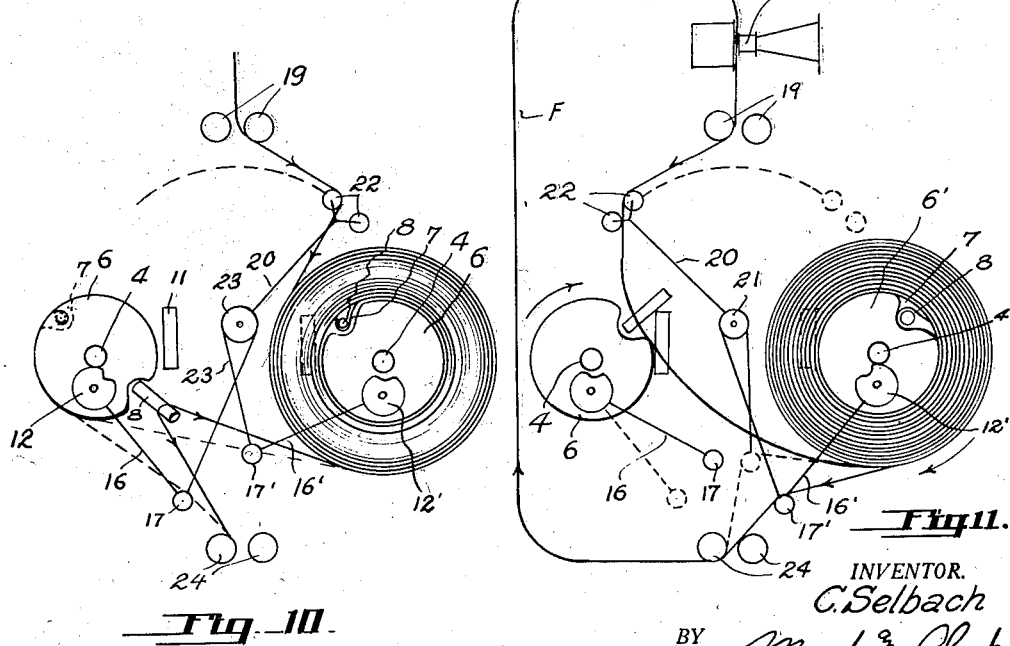
INVENTOR.
C. Selbach
BY Marks & Clerk
ATTORNEYS.

Patented May 20, 1930

1,759,024

UNITED STATES PATENT OFFICE

CHRISTIAN SELBACH, OF KITANO-MACHI, KOBE, JAPAN

FILM WINDER

Application filed December 20, 1926, Serial No. 156,027, and in Japan June 5, 1926.

My invention relates to improvements in cinematographic apparatus and more particularly to film-winders, and has for its object to provide means rendering a film-winder of the class specified operative continually for the projecting purpose, with no need of specific re-winding apparatus.

Another object of my invention is to obtain means whereby a cinematographic film can be re-wound simultaneously with its projection, so that the opening end of a film becomes ready for the next projection directly after the closing end has been projected.

Another object of my invention is to provide means for saving time such as would be required in re-winding a film, after the film has been projected, for the next projection.

A further object of my invention is to provide means whereby all the film-reels comprising a daily or weekly programme may be connected with each other into one continuance, and the whole film thus connected together may be projected in the proper order, becoming quite ready for the next projection directly after the completion of the whole programme.

A still further object of my invention is to save films from wear and tear due to the customary re-winding thereof whereby the films are usually damaged or spoiled and also subjected to various dangerous influences.

A still further object of my invention is to enable unskilled operators to operate cinematographic machines without any assistance of additional staff.

Other objects and particularities of my invention will be described more fully in the following detailed descriptions, with reference to the accompanying drawings wherein:—

Fig. 6 is a perspective of the embodiment with an inserted film ribbon.

Figs. 7 to 11 are diagrams showing the respective phases of operation of my film winder.

Figure 1:
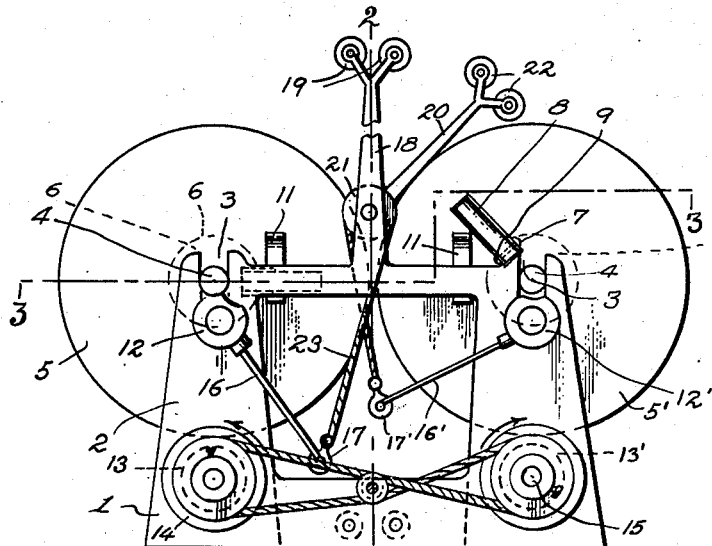
Fig. 1 is a front elevation of one embodiment of my invention.
Figure 2:
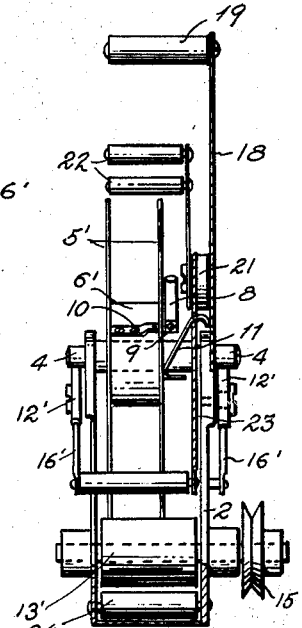
Fig. 2 is a sectional side elevation of same taken at line 2—2 in Fig. 1.
Figure 3:
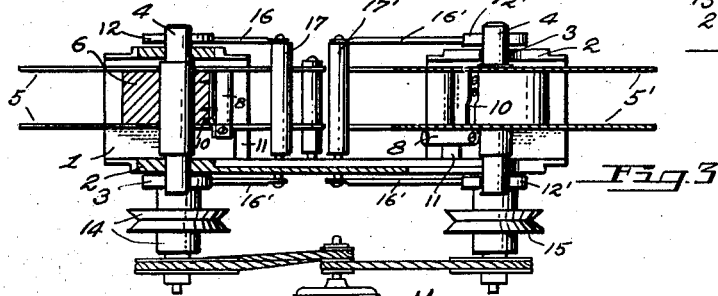
Fig. 3 is a sectional plan view of the embodiment taken at line 3—3 in Fig. 1.
Figure 4:
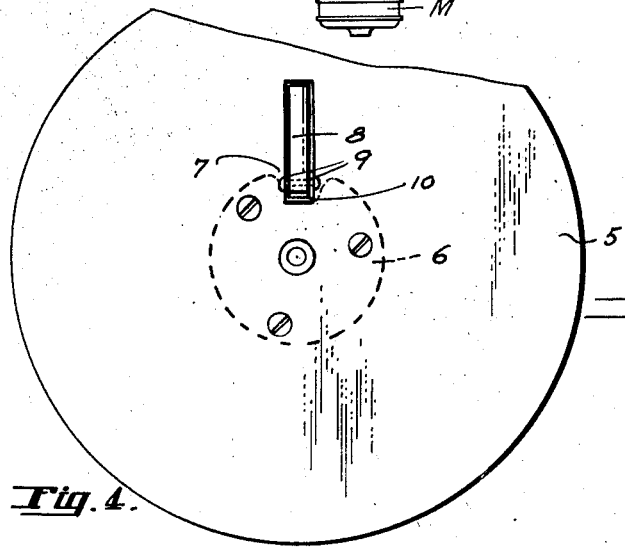
Fig. 4 is a front view of one of the circular film cases as part of the embodiment in Fig. 1.
Figure 5:
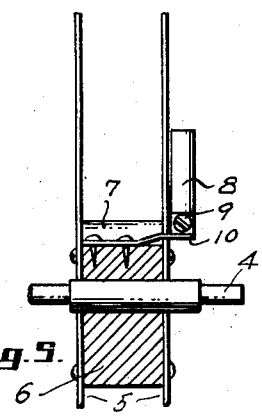
Fig. 5 is a sectional side view of same.

Referring to Figs. 1–6 inclusive the embodiment comprises in general a frame 1 having a pair of forked legs 2. Each leg 2 has a pair of recesses 3 in the upper ends of the forked portions, adapted to rotatably receive both ends of a shaft 4. On the two shafts 4, circular film cases 5 and 5' are carried respectively.

The film cases 5 and 5' respectively have in their center hub portions 6 and 6' adapted to have a film ribbon wound therearound. The circular surface of each hub portion is provided with a longitudinal groove such as 7 respectively, adapted to receive a film catching piece, such as 8.

The piece 8 is at one end swingingly fixed to bracket portions 9 which are bent out from the respective circular side plate of the film case. Piece 8 is adapted to take either of the axial positions within the groove 7 of the hub portion or the radial position behind the said circular side plate of the film case, as shown in Figs. 1–5. On the bottom of groove 7 a resilient piece or leaf spring 10 is provided for releasably holding the film-catching member 8 at either of the two positions shown. Resilient member 11 fixed on the frame 1 causes film-catching member 8 to be forced from said radial position to said axial position, when the film case as a whole is rotating in the direction of the arrow, as shown in Fig. 1. The hub 6' has the same construction and attachments with the hub 6.

Both of the ends of shafts 4 are so arranged to respectively co-operate with cam members 12 and 12' rotatably mounted on the legs 2 below the shaft ends. At the position of the pair of cams 12' as shown in the right hand side of Figs. 1 and 6, both ends of shaft 4 of the circular film case 5' are disengaged with cams 12', whilst the periphery of the circular side plates of said film case 5' frictionally engage a driving roller 13'. At the position of cams 12 as shown in the left hand side of Figs. 1 and 6 the periphery of the circular side plates of film case 5 is disengaged with the driving roller 13 and said cams 12 are engaged with the ends of shaft 4 of the circular film case 5, where said cams act as supporting bearings for the rotating circular film case. The driving rollers 13 and 13' are provided with axles and driving pulley members 14 and 15 respectively. The said axles revolving each in two journal-bearings which are mounted on the lower part of legs 2, of frame 1. The pulley members 14 and 15 are rotated in opposite directions to each other by means of a convenient prime mover, not shown, such as an electric motor or a manually operated handle for operating the cinematographic machine proper, through, for example, an open and cross beltings respectively, not shown.

Each cam member 12 has a rod 16, and each cam member 12' has a rod 16' respectively fixed thereto and extending downward towards the center of the frame, and between each pair of the cam rods 16 and 16' a roller 17 and 17' is horizontally mounted respectively.

It will be noted that the apparatus has a symmetrical arrangement with respect to its vertical center line, as far as the circular film cases 5 and 5' and frame legs 2 and their attachments are concerned.

The frame 1 has a portion 18 with two film guide rollers 19 mounted parallel on the forked end. Swinging lever 20 is on one end kept in the form of a groove pulley 21 and rotatably fixed with the pulley's center to the portion 18. On the forked end of the lever 20 are two film guide rollers 22 mounted. One end of a chain or cord 23 joins the horizontally mounted roller-shaft of roller 17, and the other end joins the horizontally mounted roller shaft of roller 17'. Said chain or cord 23 is laid across the grooved pulley 21 of swinging lever 20, thus causing lever 20 to follow the movements of levers 16 and 16' respectively.

The parallel mounted guide rollers 24 are placed on frame 1 below.

Referring now to Figs. 7-11 inclusive, in operation, the apparatus shown may be situated below or above the cinematographic projector P, and join with the projecting machine say by an open and cross beltings laid over pulley members 14 and 15. The film ribbon F is bifilar coiled on hub 6 within the circular film case 5. Before coiling the film ribbon, the middle of the film length is placed between hub 6 and the catching member 8 and thus bifilar coiled around hub 6, as shown in Figs. 8 and 9. After this coiling the continuance and the end of the film ribbon is joined together and the obtained loop placed between rollers 24, 22 and 19, and the continuance part of the film inserted into the projecting machine all as shown in Figs. 7 and 11 respectively.

At the beginning of the projection the two pairs of cams 12 and 12' take their respective positions as shown in Fig. 7, and consequently the film case 5' is in frictional engagement with the driving roller 13', while the film case 5 is disengaged with friction roller 13. The rods 16 and 16' and consequently the rollers 17 and 17' also take the illustrated positions in Fig. 7, and the groove roller 21 is turned to have the lever 20 with rollers 22 in their right hand position. The closing end part of the film thus touches with the periphery of the hub 6'.

When the projection is started and the friction pulleys 13 and 13' begin to rotate, the film case 5' with its hubs 6' and catching piece 8 is driven to rotate. The piece 8 which assumes its radial position behind the circular plate of film case 5' at present, is engaged by the resilient member 11, fixed on the frame 1, and forced thereby to its axial position, and that portion of the film that touches the periphery of the hub 6' is caught by the piece 8, as shown in Fig. 8. The piece 8 is then kept in the axial position under the action of the leaf spring 10.

At this time the film case 5 with the bifilar coiled film inside, is suspended by cams 12 and out of engagement with the friction pulley 13, free to rotate with its shaft ends 4 on the cam's circular surface and in the recesses 3, of legs 2. The bifilar coiled film is permitted to be unwound, one layer by the pulling force of the projecting machine, the other layer by the winding action of film case 5'.

As the projection proceeds, the film is coiled by hub 6' with the connected continuance and the closing end of the inserted film caught by the member 8, the continuance portion as the inside layer, and the closing end portion as the outside layer of the bifilar coiling, as shown in Fig. 9.

When the projection is half performed, the film formerly bifilar coiled around hub 6, takes a position as shown in Fig. 10, left hand side, and by reason of the pulling force of the film, caused by the projecting engine on one side, and by the rotating film case 5' on the other side, the film catching piece 8 of film case 5 is caused to be raised from its axial to its radial position, thus releasing the film from the hub 6.

After being released, the loop of the film straightens by the above said two pulling forces, acting on the film and, engages by this straightening the roller 17'. The roller 17' in connection with rods 16' and cam members 12' is forced around about the journals of cams 12' counter-clockwise, and cams 12' then assume the position as shown in Fig. 11, right hand side, having by its rotation lifted the whole film case 5' with the bifilar wound film coil inside, thus disengaging film case 5' with the driving friction roller 13'. In consequence of the engagement of the straightening film loop with the roller 17', the cams 12 are turned counter-clockwise by chain or cord 23, following the above-referred motion of the cams 12' and assume the position, as shown in 11, left hand side. At this position cams 12 have ceased to support the now empty film case 5 but have allowed same to come in touch with the rotating friction roller 13, by lowering film case 5. At the same time the lever 20 with the groove pulley 21 in connection with the chain or cord 23 and rollers 22 with the film between them, is swung counter-clockwise, bringing said film in touch with the periphery of hub 6, as shown in Fig. 11, left hand side. Film catching piece 8 of the now frictionally driven film case 5 is forced from its radial to its axial position by resilient member 11 catching by its movement the film, touching hub 6 as mentioned above. The film is now bifilar coiled around hub 6, just as described with respect to the hub 6' and the projection of the film is performed for the remaining half of the film.

At the completion of the projection the whole film has been coiled in the film case 5, with its connected continuance and closing end at the outer periphery of the coil. Releasing of the film from hub 6' disengagement of the film case 5 with the friction roller 13, engagement of film case 5' with friction roller 13' and bringing the film into contact with the periphery of hub 6' are obtained in the same way, but applied to the other side, as described when the film was half projected. The film is now in the same position as originally described when starting the projection and as shown in Fig. 7, quite ready for next projection.

With my improved device, it will be readily understood, that in addition to the prescribed advantages, various other mechanical and economical advantages can be obtained, particularly when used in cinematographic halls, school and lecturing halls, and film manufactory, etc.

At cinematographic halls my invention enables the operator to manage the whole apparatus and control the speed of a screened film and intervals between composite film-programme, by means of a regulating switch only. Any technical training of the operator will not be required for managing the whole installation without any further staff.

At schools and lecturing halls, my invention secures a continuous projection of an assembled teaching programme before the audience by the professors themselves. Any further expenses for the attention of the apparatus are not necessary.

For film manufacturers, important industrial advantages will be secured. An original film once set in my apparatus is always ready for projection for the purpose of making a copy of the original film. It is not necessary to take out the original film for re-winding after every projecting process.

My invention will also introduce important advantages into advertising purposes.

Although I have shown only one embodiment of my invention, it will be obvious to those skilled in the art that various changes and modifications may be made in the constructions and arrangements of the parts thereof without departing from the spirit and scope of the invention. For example, the cam members 12 and 12' may be substituted by eccentric disc mounted on the fixed parts of the apparatus, and I, therefore, desire that no other limitation shall be imposed on the invention than those imposed by the prior arts or as set forth in the appended claims.

What is claimed and desired to be secured by Letters Patent is:—

1. A film-winder comprising a plurality of rotatable shafts, a plurality of film cases respectively carried thereby, a plurality of rotating wheels for driving said film cases respectively, cam members in co-operation with said shafts respectively, for raising and lowering the shafts to operate said film cases to engage and disengage said wheels alternatively, means for connecting said cam members with each other, said means comprising rods with roller, a pulley, a flexible connecting medium over said pulley, a rocking lever attached to the frame and carrying said pulley, all adapted to be acted upon by the film after every half of the performance of the film projection.

2. A film-winder comprising a frame, a plurality of film cases rotatably mounted on said frame, a motor, a plurality of driving shafts and wheels connected through beltings respectively with said motor and rotated thereby in opposite directions to each other, a pair of cam members for each of said film cases in co-operation therewith, for lifting and lowering said film cases from and into frictional engagement with said driving shaft and wheel, a rod extending from each of said cam members, a roller carried between the outer ends of a pair of said rods, a flexible element arranged between said rollers, a pulley on said frame adapted to be rotated by engagement with said flexible element between a pre-determined angle, an arm extending from said pulley, a pair of second rollers carried in parallel on the outer end of said arm, each of said film cases having a hub with a film catching member pivoted in a groove therein and adapted to swing between two positions axial and radial with respect to said hub, and a resilient member for holding said film-catching member in either of said two positions, and another resilient member mounted on said frame and adapted to force said film catching member into said axial position when engaged therewith.

In testimony whereof I affix my signature.

CHRISTIAN SELBACH.